United States Patent
Lee et al.

(10) Patent No.: US 11,409,733 B2
(45) Date of Patent: Aug. 9, 2022

(54) AUTOMATIC RECLAMATION OF STORAGE SPACE FOR DATABASE SYSTEMS

(71) Applicant: Oracle International Corporation, Redwood Shores, CA (US)

(72) Inventors: Teck Hua Lee, San Mateo, CA (US); Tirthankar Lahiri, Palo Alto, CA (US); Yunrui Li, Los Altos, CA (US)

(73) Assignee: Oracle International Corporation

( * ) Notice: Subject to any disclaimer, the term of this patent is extended or adjusted under 35 U.S.C. 154(b) by 0 days.

(21) Appl. No.: 16/948,306

(22) Filed: Sep. 11, 2020

(65) Prior Publication Data

US 2021/0081399 A1  Mar. 18, 2021

Related U.S. Application Data

(60) Provisional application No. 62/900,461, filed on Sep. 14, 2019.

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01)

(58) Field of Classification Search
None
See application file for complete search history.

(56) References Cited

U.S. PATENT DOCUMENTS

| 8,793,290 B1* | 7/2014 | Pruthi | G06F 3/0644 |
| | | | 707/821 |
| 9,940,331 B1 | 4/2018 | Bono et al. | |
| 2016/0004447 A1* | 1/2016 | Sundaram | G06F 11/2092 |
| | | | 711/114 |
| 2019/0384518 A1* | 12/2019 | Park | G06F 3/061 |

OTHER PUBLICATIONS

Blake, E., "Improving sparse file handling," Linux Plumbers Conference, dated Aug. 29, 2012.
"Can a file that was originally sparse and then expanded be made sparse again?," Unix & Linux, StackExchange, dated Oct. 16, 2012.
Corbet, J., "Punching holes in files," LWN.net, dated Nov. 17, 2010, URL: https://lwn.net/Articles/415889/.

* cited by examiner

*Primary Examiner* — Irene Baker
(74) *Attorney, Agent, or Firm* — Vista IP Law Group, LLP

(57) ABSTRACT

An approach is described to provide a method, a computer program product, and a computer system to implement hole punching. The described approach provides an automated way to free up space without requiring manual intervention by a DBA to manually reorganize database objects to free up space.

27 Claims, 16 Drawing Sheets

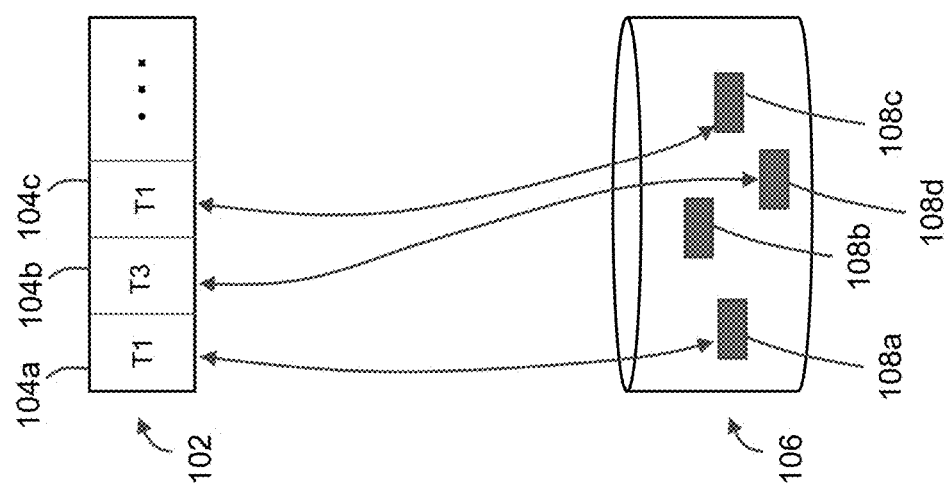

AUTOMATIC RECLAMATION OF STORAGE SPACE FOR DATABASE SYSTEMS

CROSS-REFERENCE TO RELATED APPLICATION

The present application claims the benefit of priority to U.S. Provisional Application No. 62/900,461, filed on Sep. 14, 2019, which is hereby incorporated by reference in its entirety.

BACKGROUND

Data processing systems, such as database management systems (DBMSs) and relational database management systems (RDBMSs), allow applications running on clients (e.g., workstations, personal computers, or remote computing terminals) to access data stored in databases located at one or more database servers. Database servers may be interconnected by a network. This network may also connect one or more clients to the database servers, allowing the clients to submit queries and requests to perform operations on the data stored at the database servers via the network.

In a cloud environment, the database may be provided as a service to users or customers. The database services in the cloud could be implemented using a multi-tenant model, e.g., where the database cloud service may have a large number of tenant databases. Each database may be running OLTP (online transaction processing), OLAP (online analytical processing), or mixed workloads. The databases provided to users are composed of tablespaces, which may be formed from multiple sets of contiguous portions of storage (also referred to as "extents").

The issue addressed by this disclosure is that as operations are performed on the database, the data stored within certain extents may be deleted from the database. However, that extent that was formerly used to hold the deleted data is still treated by the system as being allocated to the tablespace, and therefore even if it currently holds no data, cannot be used by any other database. This means that over time, excessive amounts of free space may be locked up in these fragmented portions of the storage system, which is inefficient and wasteful since they cannot be used by the system for users that actually need to store data in the storage devices.

Today, a database administrator (DBA) has to manually reorganize (e.g. move or shrink) database objects to free up space. When sufficient space has been freed up either naturally (e.g., from delete rows, drop objects) or reorganization, the DBA then has to manually resize the data file to release space back to storage. Such manual approach is not feasible in large database systems having many users and extremely large numbers of database objects, such as a database cloud service with a very high number of tenant databases.

Therefore, there is a need for an improved approach to address the issued identified above.

SUMMARY

Embodiments of the present invention provide a method, a computer program product, and a computer system to implement hole punching. This approach provides an automated way to free up space without requiring manual intervention by a DBA to manually reorganize database objects to free up space. With embodiments of the invention, the database and its users can expect better performance since database objects become less fragmented, and various types of workloads can benefit from better caching across various layers and reduced I/O costs.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of some embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope.

FIGS. 3A-G provide an illustrative example of this embodiment of the invention in which space is reclaimed for allocations to a database object.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Some embodiments are directed to an approach for performing hole punching in a storage system. This provides a mechanism to automatically reclaim storage space in a running database so that storage can be overprovisioned as efficiently as possible among all the tenant databases.

Figure 1:
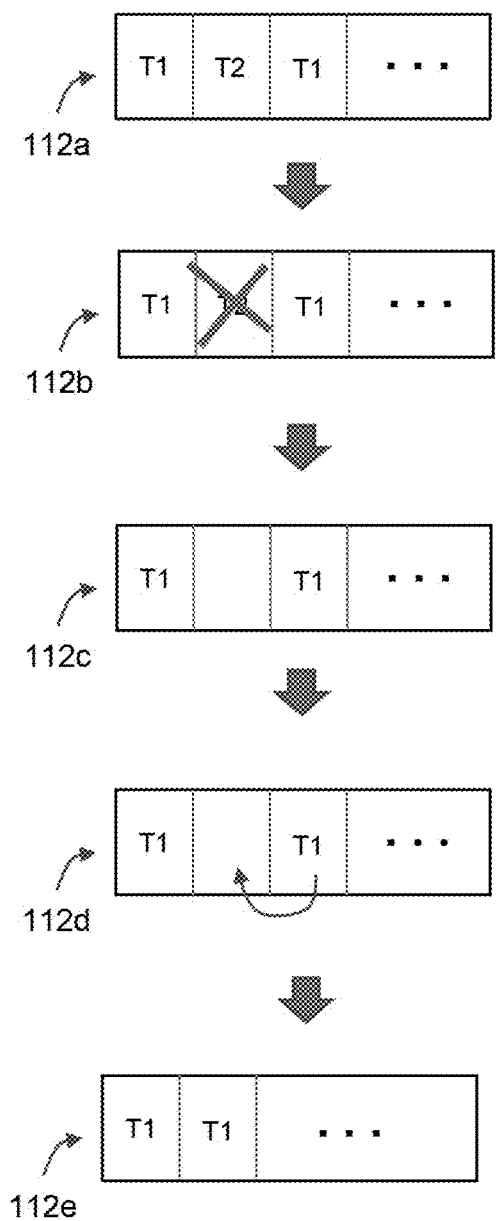
FIG. 1 illustrates a non-optimal approach to implement reclamation.

Before describing the invention in detail, it is helpful at this point to first describe conventional, non-optimal approaches to reclaim storage space in a database system, where a DBA typically performs manual reorganization to reclaim the storage space. To illustrate a conventional non-optimal approach, consider a storage object as shown in FIG. 1, which may represent a file in a database having multiple extents allocated from within the file to tables. For example, 112a shows the situation when three extents have currently been allocated within the file. In particular, a first extent has been allocated to table T1, a second extent has been allocated to table T2, and a third extent has been allocated to table T1.

As operations are performed on the database, the data stored within one or more extents may be deleted from the database. For example, consider the situation when table T2 is deleted from the database system, as illustrated at 112b. As shown at 112c, the extent that was formerly used to hold the deleted data for table T2 is still treated by the system as being allocated to the tablespace, and therefore even if it currently holds no data, it is still nonetheless occupying some physical storage space that is associated with the extent. This means that over time, this type of situation will cause excessive amounts of free space to be locked up in these fragmented "holes" within the storage system.

The conventional approach to address this situation is to have the database's DBA perform manual operations to free up the locked-in extents in the tablespace. For example, compaction is an approach to reclaim space in the storage system, where the empty extents are handled by co-locating the filled extents together, e.g., by packing the used extents together at the head/front of a group of extent, thereby leaving the empty extents as a group at the tail/end of the group of extents. This is illustrated in the sequence from 112d to 112e, where the extents for T1 are packed together to fill in the hole created by the deletion of table T2. This allows the entire contiguous group of unused extents at the end of the file to be reclaimed at once in a large amount of reclaimed storage. When sufficient space has been freed up either naturally (e.g., from delete rows or drop objects) or reorganization, the DBA then manually resizes the data file to release space back to storage.

The problem with this approach is that, in real-world database systems, many holes may exist at numerous locations within files for the large number of users/tenants in the system, and it can become very expensive to perform the large number of data movement operations that potentially may be needed to pack all the used extents together. This excessive expense may create delays for user activity and incur costs that outweigh any immediate savings for the system. In addition, the manual activities may not be feasible in a database cloud service with very high numbers of tenant databases.

Figure 2:
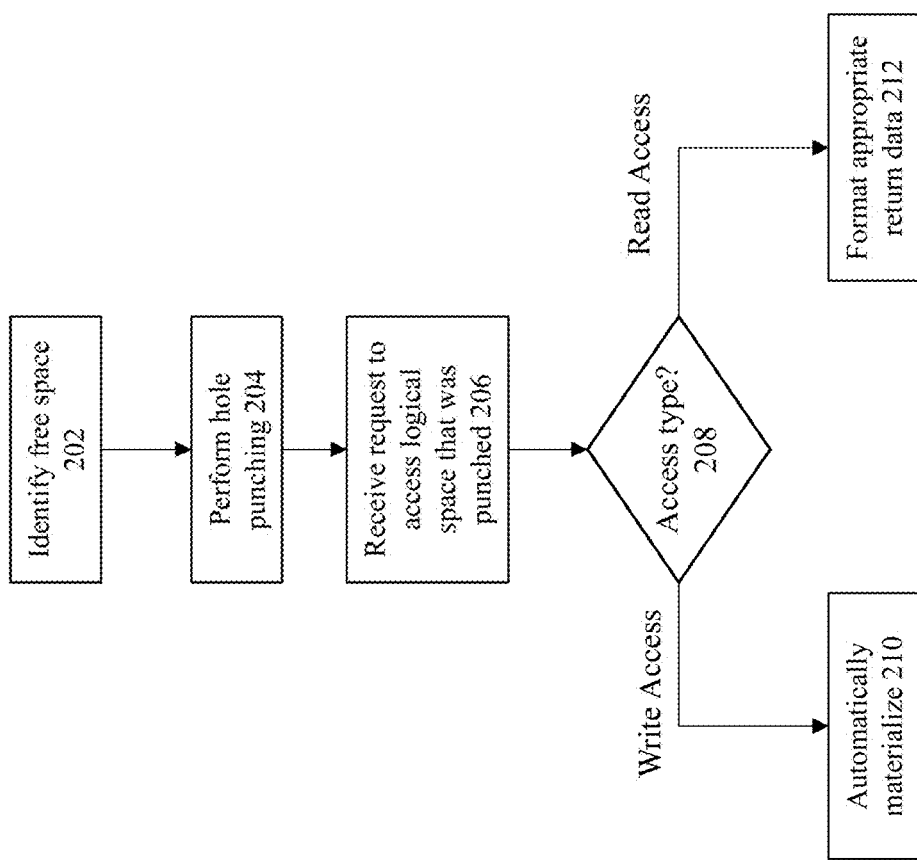
FIG. 2 provides an illustration of an approach to implement some embodiments of the invention.

Embodiments of the invention provide an approach to reclaim storage space which resolves these issues. FIG. 2 provides an illustration of an approach to implement some embodiments of the invention, where the approach automatically reorganizes database objects to create free space. At step 202, the process identifies space that should be freed up within the database system. For example, this action may be used to identify contiguous ranges of free space in the data files of running databases.

For purposes of discussion, consider that a tablespace for a database may be allocated to include multiple portions of contiguous storage space on a physical storage device (e.g., referred to as an extent), a collection of which forms a file. At the database level, this is a logical representation of space. At the physical storage level, this is a set of contiguous storage portions, e.g., on hard disk drive or on a SSD. The storage tier will maintain a mapping between the physical storage and the logical representation at the database level to that physical storage. Step 202 identifies the situation when, at the logical database level, some of the allocated storage is no longer being used by the database to store data, forming a free space range that can now be reclaimed.

At step 204, such a free-space range will be "punched" to create a hole in the file. This action separates the direct relationship between the logical allocation of the space in the extent and the physical allocation of storage space in a storage device. In effect, the allocations at the database level still "believe" that space has been allocated to the extent, but the allocations at the physical storage level recognizes that no physical storage is actually allocated to the freed extent. As such, the underlying physical storage for the free-space range is now freed to be used by another user/tenant.

At some later point in time, at step 206, the database may choose to try and access the logical space that is no longer associated with physical storage. The access request may be either a read access or a write access. At 208, a determination is made of the specific access type associated with the request.

If the request is a write access, then at step 210, when the database attempts to write into a hole, then storage space will be automatically "materialized" to allocate physical storage for that extent. In effect, the storage layer will allocate physical storage that now will newly map to the local storage space. This makes it completely transparent to the database whether real physical space was or was not associated with the logical space prior to the database access.

If the request is a read request, then at 212, when a database reads from a hole, the storage layer will serve an empty data block. In some embodiments, the storage layer is programmed to serve up data in a specified format so as to not cause read errors back to the requester. Therefore, the storage layer cannot simply read some content from a newly or randomly allocated block/extent, since the content of that block/extent may be gibberish that would cause an error. Instead, an empty data block of the appropriate format is provided in response to a read of the hole.

FIGS. 3A-G provide an illustrative example of this embodiment of the invention in which space is reclaimed for allocations to a database object. Typically, a database object (e.g., table, index, LOB, etc.) obtains space from a tablespace. In some embodiments, a tablespace is backed by datafile 102 and is partitioned into extents. Here, the datafile 102 includes three allocated extents, including extent 104a allocated to table T1, extent 104b allocated for table T2, and extent 104c allocated for table T1. The database object ultimately stores data in fixed-size blocks within an extent. In a cloud environment in some embodiments, the tablespace backed by the datafile can be shared within a tenant database.

The allocated extents 104a correspond to portions of contiguous storage space on a physical storage device 106. In particular, extent 104a corresponds to physical storage 108a, extent 104b corresponds to physical storage 108b, and extent 104c corresponds to physical storage 108c. What this shows is a logical representation of allocated space represented by extents 104a-c, which correspond to real storage which are respectively allocated at storage location 108a-c within the physical storage device 106. At this current stage, this means that the quantity of the logical representation of allocated storage in extents 104a-c (e.g., 3n GB of logical storage) is the same as the real allocation of physical storage at storage locations 108a-c (e.g., 3n GB of physical storage).

Figure 3A:
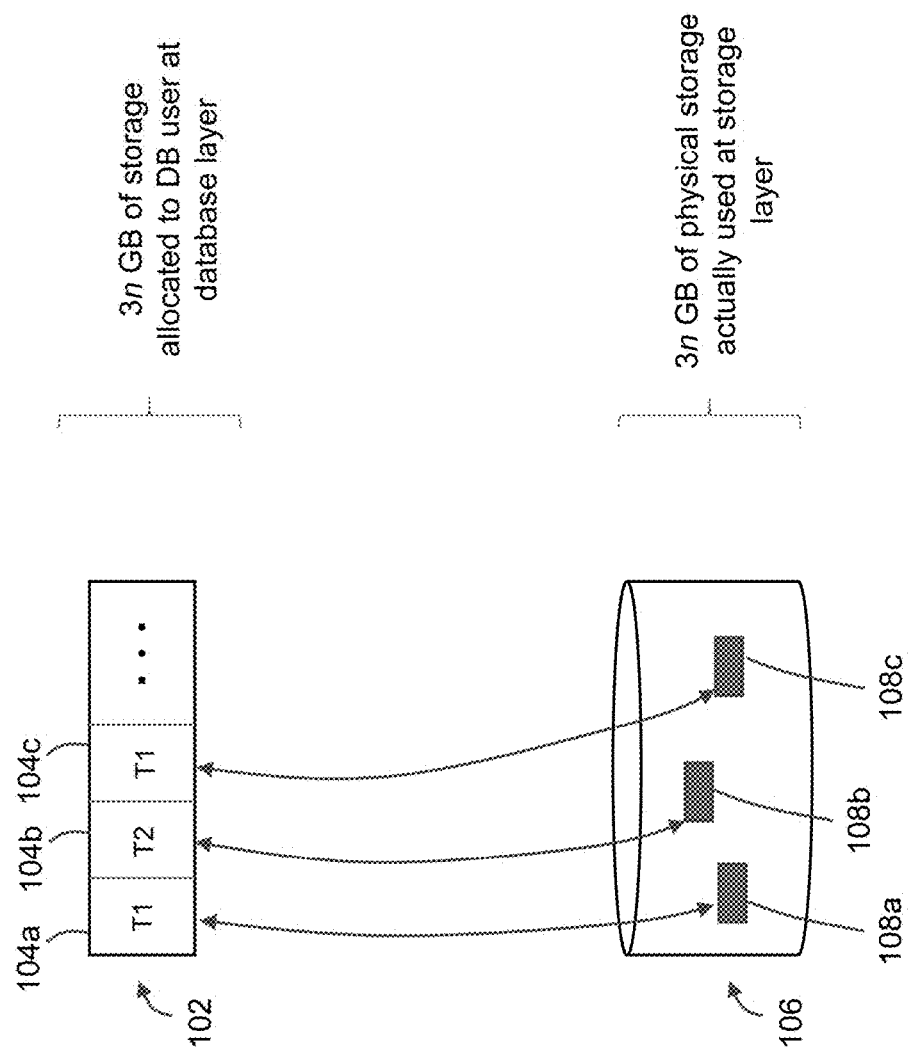
Figure 3B:
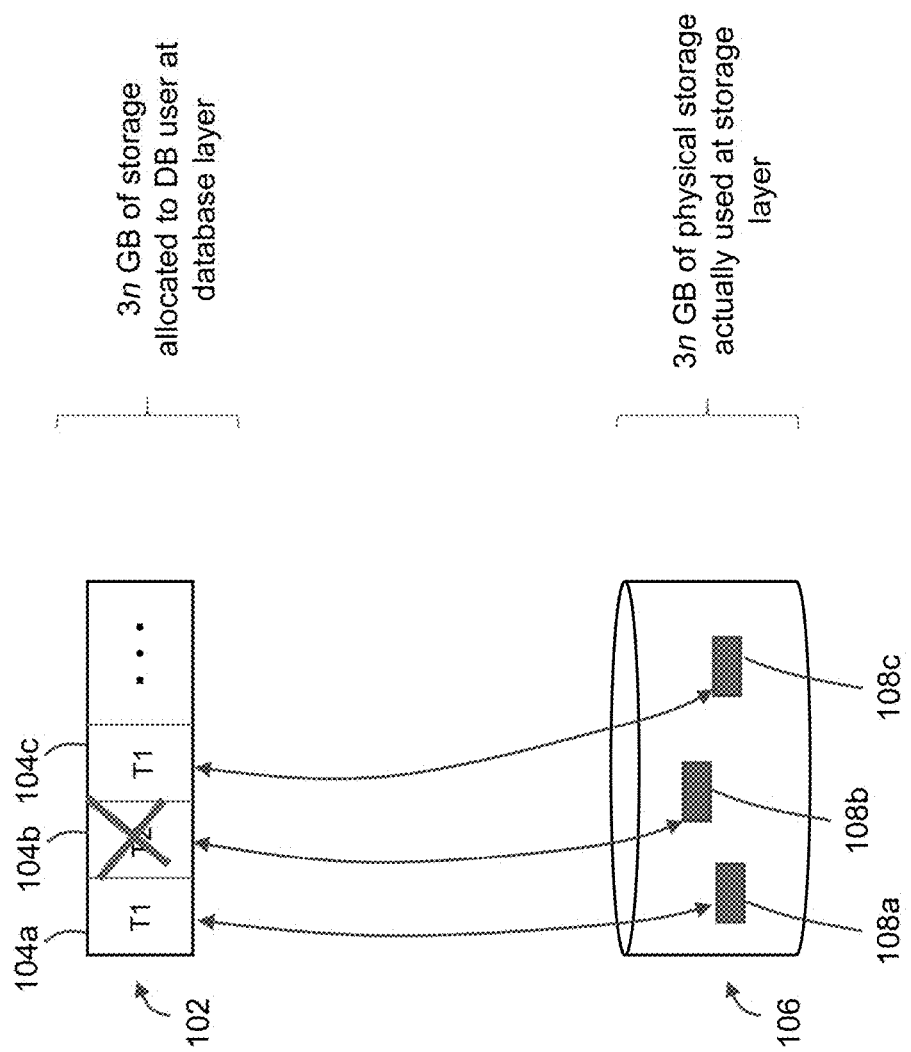
Figure 3C:
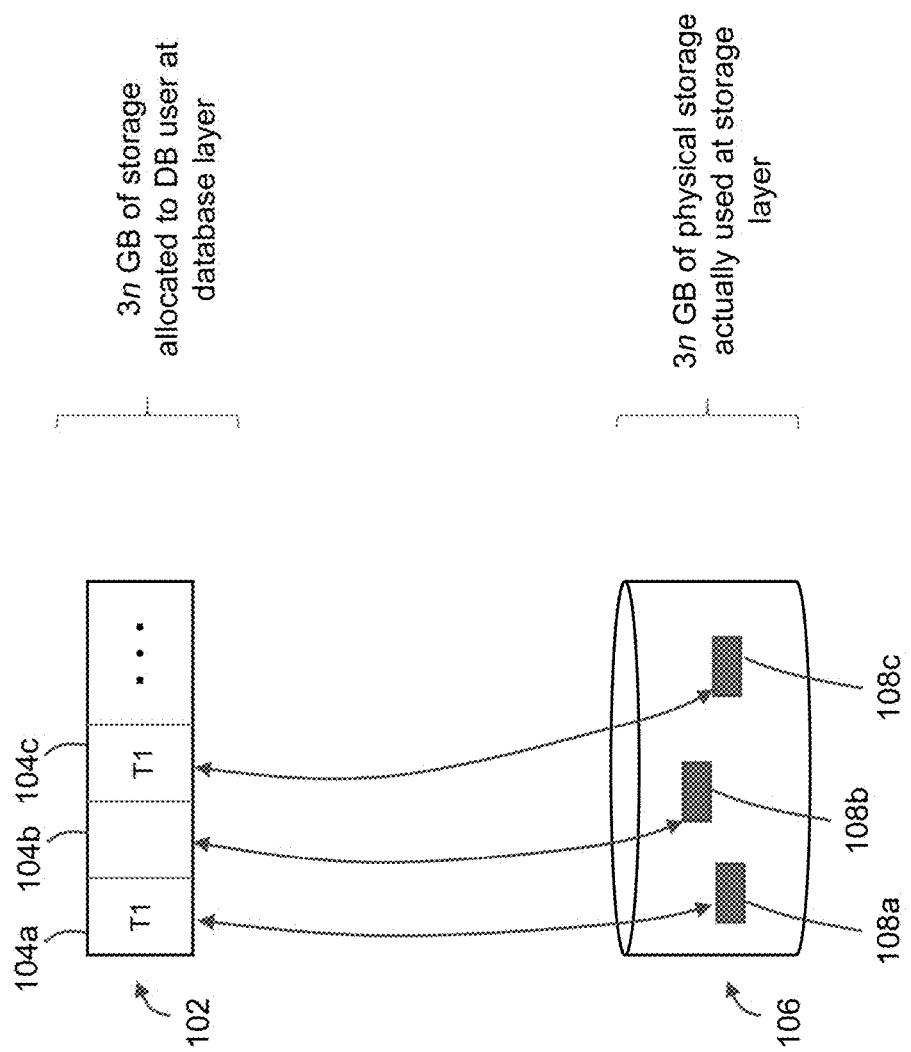

As shown in FIG. 3B, assume that table T2 has been deleted from the database system. In this situation, as shown in FIG. 3C, extent 104b is no longer considered to be "owned" by table T2, since table T2 no longer exists. However, from the perspective of the overall system, physical storage 108b is still considered by the storage system as being allocated to extent 104b. Therefore, even though extent 104b is not currently being used by database entity and therefore storage location 108b is also not currently being used, this situation nonetheless still keeps any other entity (e.g., a different tablespace/tenant from the tablespace that corresponds to T1) from being able to use the underlying storage location 108b. At the logical database level, allocated storage is no longer being used by the database to store data, thus forming a free space range that can now be reclaimed.

Figure 3D:
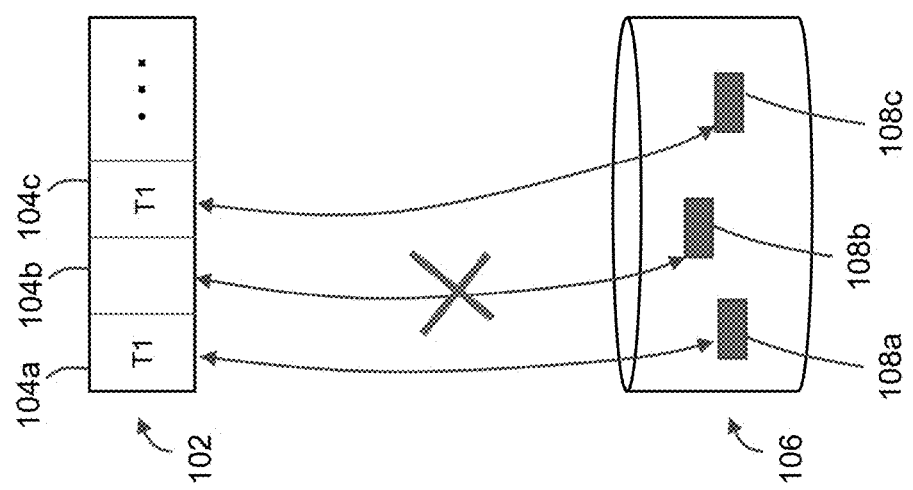
Figure 3E:
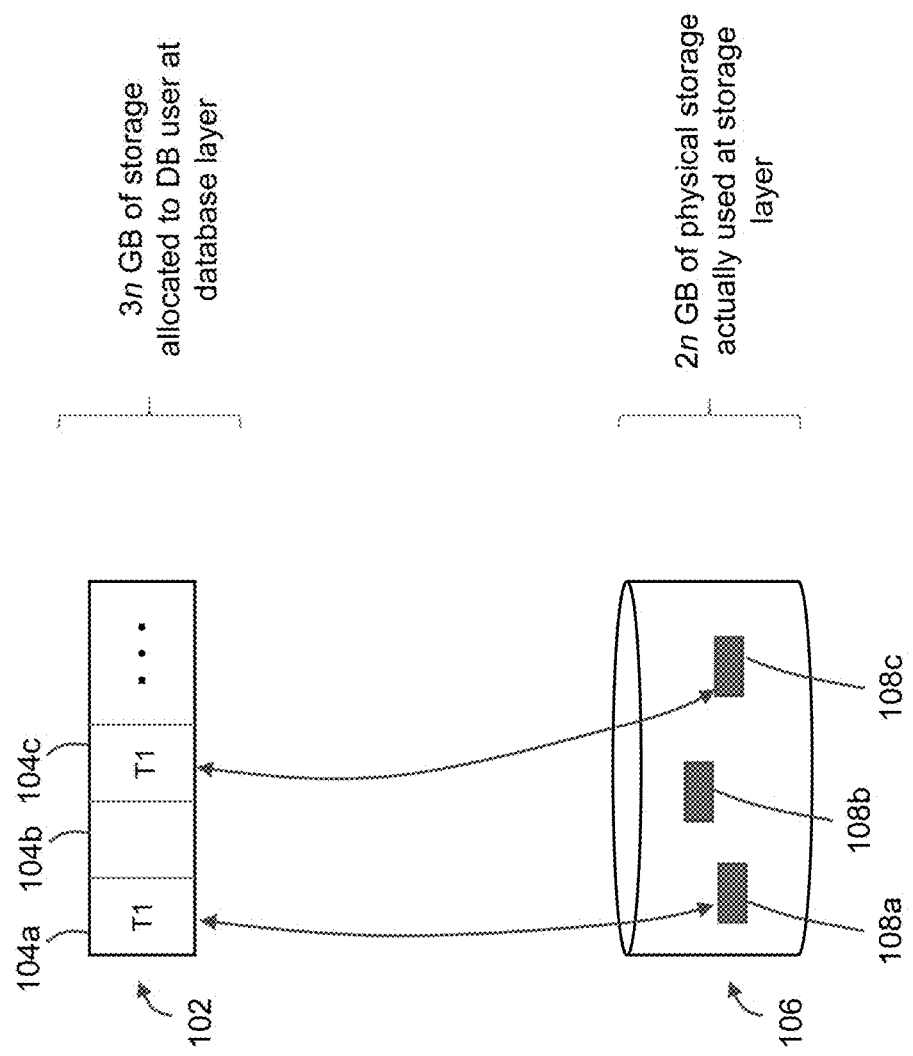

At this point, as shown in FIG. 3D, the free-space range can be punched to create a hole in the file. As shown in FIG. 3E, this means that the physical storage 108b that was formerly allocated to extent 104b is at this point no longer allocated to that extent. The file 102 will now occupy a smaller size in physical storage compared to the size that was previously provisioned to the user. In the current example, this means that from the user's perspective, since extent 104b still exists in the system as an allocated extent, file 102 is still associated with an allocation of 3n GB of storage—at least at the logical level. However, the real storage that is physically allocated to the extents 104a-c in the file 102 only correspond to physical storage 108a and 108c (and does not include physical storage 108b), which means that only 2n GB of physical storage is actually allocated for file 102. In effect, the underlying physical storage for the free-space range is now freed to be used by another tenant. However, the logical portion of the tablespace (the extent or object) is still represented as space allocated to the first user, even if there is now actually no physical storage associated with that logical space.

What this means is that since the database thinks it is still allocated to the former storage, from the point of the view of the database it is still allocated all of the storage that was previously associated with it. However, the formerly allocated physical storage can now be actually allocated to someone else. This approach therefore provides an approach to "over-provision" the storage system, since the logical space allocated to the various database users now exceeds the physical space that is actually allocated.

Figure 3F:
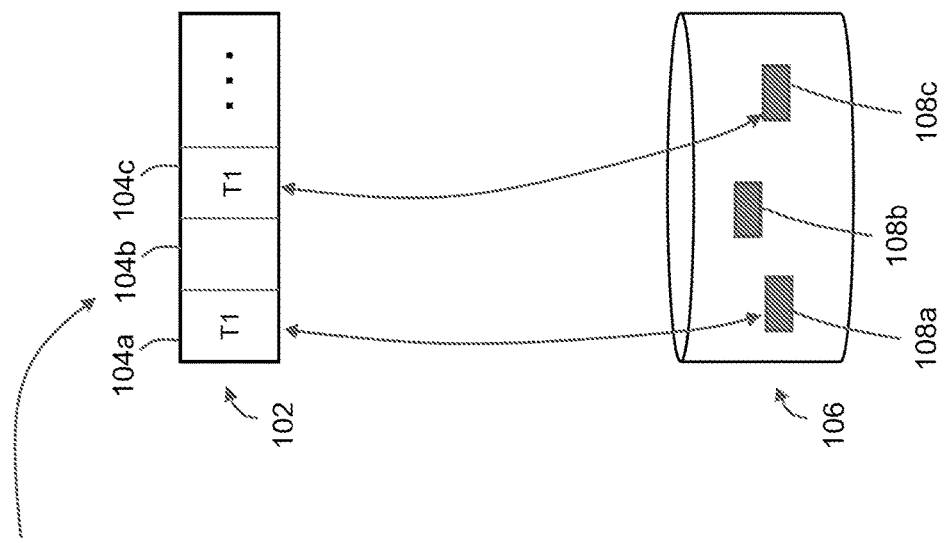

As shown in FIG. 3F, the database at a later point in time may choose to assign extent 104b to another table, such as table T3. However, based upon the previous actions described above, extent 104b is no longer associated with a physical storage location. Therefore, as shown in FIG. 3G, a step is performed to "materialize" a storage location in physical storage for extent 104b. As shown in this figure, a new physical storage location 108d may be allocated at this point to extent 104b. Alternatively, the former storage location 108b may also be allocated for extent 104b if not already allocated to another user.

Figure 4:
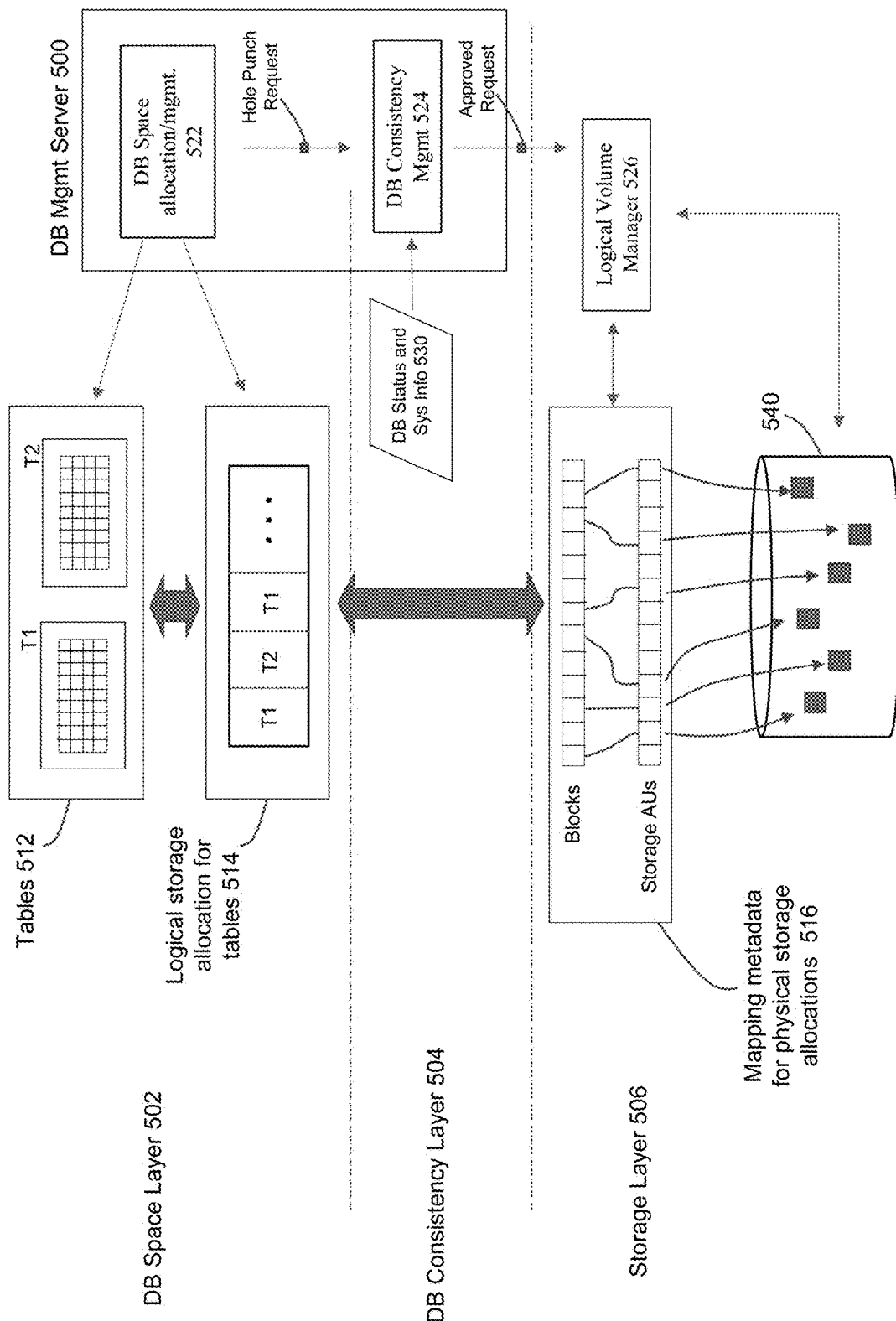
FIG. 4 provides an illustration of certain computing components pertaining to the hole punching process according to some embodiments of the invention.

FIG. 4 provides an illustration of certain computing components pertaining to the hole punching process according to some embodiments of the invention. As previously discussed, hole punching is a technique by storage system to save storage space when a "space layer" in a database considers a contiguous range of blocks in a datafile as "free". From an architectural perspective, the system may include a database space layer 502, a database consistency layer 504, and a storage layer 506. The consistency layer 504 may be interchangeably referred to herein as a "recovery" layer.

The space layer 502 is a layer operated by a database management server 500 that maintains the database tables 512 and performs the logical allocation 514 of extents within files to the tables 512. A DB space allocation/management module 522 may be provided within the database management server 500 to manage these operations within the space layer 502.

The punching process is made more complicated in database systems due to the reliance that may exist for various database processes upon deleted data. For example, a "flashback" query is a type of query that operates upon data states that exist for past or historical time periods, which may involve the need to access earlier version of data and/or log entries to re-create the data state for the earlier time periods. To achieve this, the database may need to access content that had previously been deleted, which means that it can be contemplated that the hole punching process may need to be controlled or handled so as to make sure certain storage space associated with "SCN" (system commit number) values or ranges that need to be retained do not undergo hole punching in a way that would interfere with the ability of the database to perform its operations. The recovery layer 504 may sit beneath the database (space) layer 502, where the recovery layer 504 analyzes DB status and system information 522 (e.g., pertaining to particular SCN values) to determine whether and/or how hole punching is permitted for a given free space range. A DB consistency management module 524 may be provided to perform these operations in the consistency layer 504.

For example, consider the situation when the database system includes functionality to perform "flashback" queries to query against data from an earlier point in time. There is a possibility that some of the data sought by the flashback query may exist in a deleted block, since that content in the deleted block is from within a flashback timeframe or time period for which the flashback query is enabled. In this situation, an identifier of a time period (e.g., using a SCN) may be used to identify SCN-based time periods for which any deleted block corresponding to that time period (e.g., based upon an SCN associated with data in the block) is either permitted or not permitted to undergo hole punching due to a possibility that re-assignment of the underlying storage for the block with create an "inconsistency" for flashback purposes (e.g., an error may occur or the hole punching results in an inability to perform the flashback query). As another example, consider the situation when there is a need to preserve data to avoid possible inconsistencies due to a failure situation. This is because it is possible that a gap may exist between the content that was stored in a recent data checkpoint and the content in the stored database logs (e.g., redo logs), where data corresponding to that gap only exists in a deleted block. In the event of a failure, this means that the database can only be restored to a consistent state if the content of the deleted block is accessed to obtain that data to fill that gap between the checkpoint and the start of the redo log records. In this situation, the system should not permit re-assignment of the underlying storage for the block since this will create an inconsistency for restoration purposes (e.g., the hole punching results in an inability guarantee restoration of data to a correct and/or consistent state). As such, until a new checkpoint is performed at least up through the SCN of the deleted block, then hole punching should be avoided for that block.

The storage layer 506 resides beneath the consistency layer 504, and comprises any suitable type of storage equipment that can be used to physically store data for a database system. A logical volume manager 526 manages the allocation and de-allocation of physical storage 540 in correspondence to requests from the space layer 502. The logical volume manager 526 maintains mapping metadata 516 that maps the logically allocated blocks within the extents to the underlying allocation units within the physical storage 540. The storage layer 506 can be implemented as a storage appliance that comprises any usable type of storage device that may be employed by the database system to hold storage content, e.g., a hard disk drive (HDD) or a solid disk drive (SSD). The storage layer can be implemented using any suitable architecture or form factor according to embodiments of the invention. For example, the storage layer can be implemented a dedicated storage device such as a NAS (networked attached storage), and/or the storage layer may also be implemented as a cloud-based storage service having storage services implemented as cloud-based resources.

When the space layer 502 thinks a certain contiguous range of blocks belonging to a free segment as free, it tells the recovery layer 504 that the actual storage space for this range of blocks can be potentially optimized away, e.g., by sending a request to punch a hole. Such a request may be passed down all the way to storage layer, or may be filtered out by each layer (e.g. filtered out by recovery layer 504 due to flashback database requirement).

The space layer 502 does not rely on success or failure of any such hole-punching request. In some embodiments, the space layer 502 does not maintain any persistent data structure as to which block ranges are actual holes, since an approach that requires maintenance of such metadata at the database layers may require excessive overhead and expense. Instead, since the storage layer 506 may already be maintaining the required information within metadata 516, the space layer 502 can obtain information from layers below as to which ranges are actual holes in the storage system, and uses that as a bias that affects subsequent space allocation decisions. This is because there may be some performance implication/penalty for reading/writing blocks in a hole. In addition, in some embodiments, the space layer may maintain metadata about the holes in non-persistent memory.

In some implementations, when the space layer 502 passes down the hole-punching request, it may also pass down the file number, starting block number and ending block number, and the extent deallocation SCN (e.g., all blocks in that range must be freed before this SCN). The latter is for the purpose of the recovery layer 504 to determine, for example, if those blocks may still be needed for flashback. Alternatively, the consistency layer 504 may derive some or all of this information from metadata maintained at the database management server 500.

The space layer 502, in some embodiments, is responsible in certain circumstances to properly synchronize the hole punching request for a free extent and concurrent allocation of that extent. For example, if some direct load activity has already started using this extent, the space layer should not request hole punching anymore because doing so may result in a direct write being lost.

The storage layer 506 maintains the actual holes. For example, a sparse file support mechanism can be used to maintain the holes. Mapping metadata 516 may be employed to track the allocation of blocks within the extents to any corresponding allocation units at the physical storage. The hole punching process would involve breaking the link in the metadata between a given block and a given allocation unit, thereby indicating that the freed allocation is available to be allocated to another block/extent.

After the storage layer 506 punches a hole, reads of a block in the hole would result in an initial-formatted block that looks identical to the block image after file creation on the same storage system. From storage layer perspective, after a datafile is created on a storage system that supports concept of hole, the file contains one big hole to start with. To simplify some implementations, the storage layer 506 does not distinguish between a hole due to blocks never been written to after file creation/expansion, versus a hole explicitly requested to be punched by the space/recovery layer after the blocks have been written to and then corresponding space freed.

The storage layer 506 may decide to punch a smaller hole than requested, and/or combine the hole with adjacent holes. When a block in a hole is written into, the storage layer 506 may decide to materialize blocks in the hole adjacent to that block as well (e.g., as if they are read and immediately written back). These operations may be transparent to the upper layers and there is no correctness implication to upper layer as to what storage layer decides to do.

During hole-punching, there may be concurrent reads into a block in the hole. Such a read could see a block image before the hole punching, or could see a block image after the hole punching (i.e. the initial-formatted block), depending on timing. The readers will work correctly with either block image, except for flashback logging read (for the purpose of logging before image). Because of this, in some embodiments the recovery layer 504 would not pass the punch hole request to the storage layer 506 if flashback database is enabled and the content of the block range being requested for hole punching are still required for flashback before-image logging.

In addition, recovery operations should handle an "initial-formatted" block read from a hole in a special way, e.g., it is possible for the database recovery to see a combination of such a block image (which has a zero block SCN) and a redo change for that block that was generated before the hole punching request (e.g., before the corresponding extent was freed). The only legitimate redo change that should be generated after hole-punching recovery may encounter is the very next redo change to the block after hole-punching, which should be a block that is new. Because the block image itself does not have any SCN to suggest whether the redo change was generated before the hole-punching, or it was the very first block change to the block after the hole-punching, recovery behavior should be configured to apply the redo change only if it is for a block that is new.

In some implementations, when the storage layer fabricates the block image when a block in a hole is read, it returns an initially formatted block with a certain bit pattern. This bit pattern is different from a typical initially formatted block that is not fabricated due to reading a hole. Such a distinction is for the purpose of better detection of the latter, since for initial formatted blocks that are not due to hole-punching, the recovery layer can signal stuck recovery when it sees the combination of initially formatted block and a new non-block type of redo.

In some embodiments, the recover layer 504 will not pass down the hole-punching request if the deallocation SCN is above database checkpoint. This is because otherwise there could be multiple redo changes for the block between database checkpoint and the deallocation SCN, and if a hole had been punched, then after a system crash, an incomplete media recovery could bring back a block version that is not the last version before deallocation, and a subsequent crash recovery could skip this block, resulting in a file with a stale block version.

In some embodiments, it is space layer's decision as to when to make hole punching request. The space layer may not want to make immediate request to punch hole after an extent is freed since there may be a (small) performance penalty to punch a hole and then materialize it later at storage layer. The space layer may want to punch a hole after enough time has passed since an extent is freed to significantly to reduce queries to the corresponding object from experiences errors due to a dropped object. The space layer may decide to make a request to punch a hole in the background when there are large enough numbers of free extents.

The space layer may maintain mostly-correct information as to which blocks may be actual holes in the storage system, and may prefer to allocate from free extents that are not holes when a new space allocation request is made because it would be faster to implement future I/Os to that extent in that way. The mostly-correct information can be achieved by asking storage layer where holes are. In some cases, the space layer maintains such information in memory only. Such information may not be correct anymore after file offline/online or after online move/rekey of the file, thus space layer should ask again after those operations.

The space layer may also decides to make punch hole request for temporary files when it decides that a certain temporary file block range is free and there is no concurrent space allocation to that block range and all dirty buffers belonging to that range flushed out. For temporary files in some embodiments, there is no flashback or recovery implication.

Figure 5:
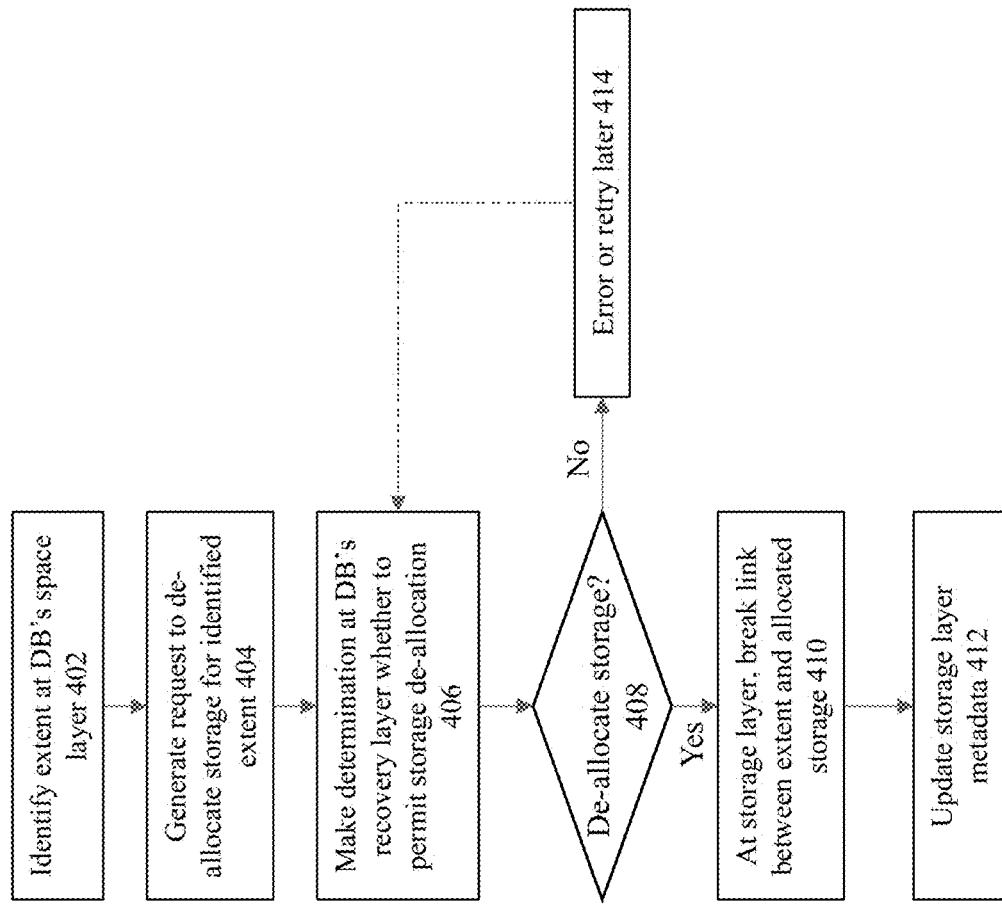
FIG. 5 shows a more detailed flowchart of process steps to perform hole punching.

Referring to FIG. 5, this figure shows a more detailed flowchart of process steps to perform hole punching using the components described above for FIG. 4. At 402, this step identifies one or more extents that should be freed up within the database system. For example, this action may be used to identify contiguous ranges of free space in the data files of running databases.

At 404, the space layer generates a request to de-allocate storage for the identified extent. As previously noted, this request is generated at the space layer and identifies a range of blocks that can be potentially optimized away. The request may be passed to the recovery layer for evaluation. As previously noted, when the space layer passes down the hole-punching request to the recovery layer, the request may also include additional information used by the recovery layer. For example, the additional information may include a file identifier/number, a range of blocks (e.g., a starting block number and an ending block number), and the extent deallocation SCN (e.g., all blocks in that range must be freed before the identified SCN).

At step 406, the recovery layer will make a determination whether the hole punching request should be either passed to the storage layer or killed/delayed. As previously noted, the recovery layer may determine that the deleted data in the extent may still be needed by the database system. At 408, if the determination was that the deleted data is still needed, then the hole punching request will not be passed to the storage layer. Instead, the process at step 414 will either identify an error and will deny the request, or in some circumstances delay the hole punching request until conditions change to the point that the deleted data is no longer needed.

If at 408 it is determined that the deleted data is no longer needed, then the recovery layer will pass the hole punching request to the storage layer. At step 410, the storage layer will perform the hole punching by breaking the link between the extent and the physical storage that was allocated to the extent. At 412, the storage layer metadata is updated to reflect the hole that was created in the system, where the condition now exists that the extent is no longer associated with allocated physical storage.

Figure 6:
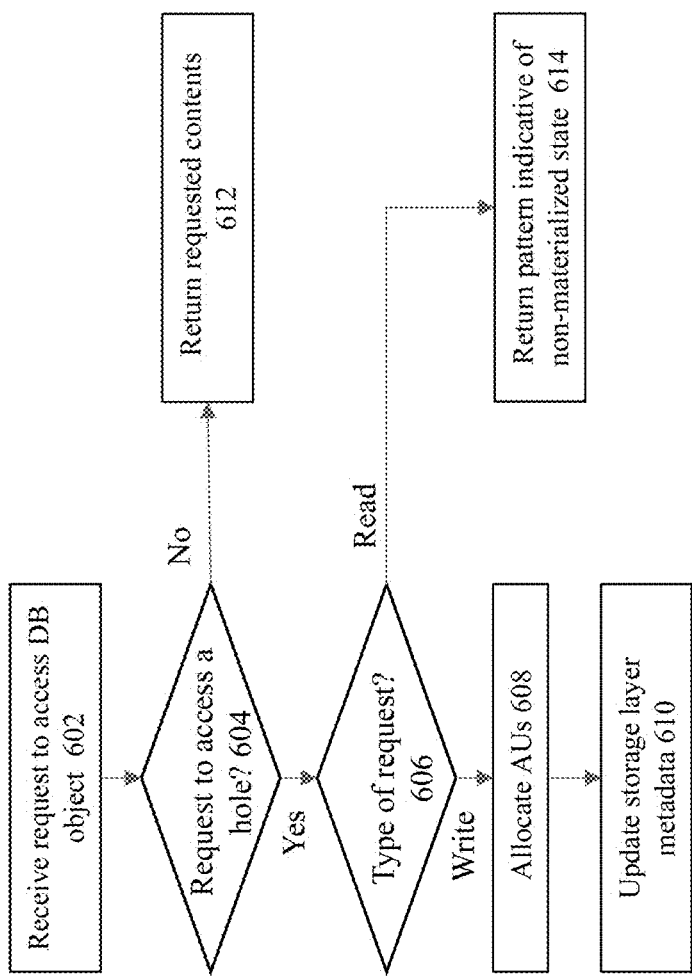
FIG. 6 shows a more detailed flowchart of process steps to perform a materialization according to some embodiments of the invention.

Referring to FIG. 6, this figure shows a more detailed flowchart of process steps to perform a materialization according to some embodiments of the invention. At 602, a request is received to access a database object. A determination is made at 604 whether the request pertains to a hole that was previously created. If not, then at 612, the normal database procedures are employed to access the object.

However, if the request is to access a hole that had previously been created as a result of hole punching, then the process proceeds to 606 to identify the type of request that is being sought. In particular, the request may seek to write to a block or to read from a block.

If the request is a write request, then at step 608, the storage layer will allocate one or more allocation units within physical storage to the storage object. Since an extent is a contiguous range of storage, then a write request for any one block within the extent will cause the storage layer to allocate enough physical storage to correspond to all blocks within the extent. At 610, the storage layer metadata will be updated to reflect the fact that the extent is no longer a hole, but is instead now a fully materialized extent having sufficient physical storage allocated to the extent.

If the request is a read request, then at 614, when a database reads from a hole, the storage layer will serve an empty data block. In some embodiments, the storage layer is programmed to serve up data in a specified format so as to not cause read errors back to the requester. Therefore, the storage layer cannot simply read some content from a newly or randomly allocated block/extent, since the content of that block/extent may be gibberish that would cause an error. Instead, an empty data block of the appropriate format is provided in response to a read of the hole.

The database can then choose to take different types of actions depending upon the context of the read request. For example, if the read request is intended to perform a backup of a set of files, then the database may choose to allow the read requests to proceed but to simply return the specially formatted data with respect to the read of the extent that is a hole, e.g., so that the backup process can compress the set of blocks in an efficient manner. On the other hand, if the read request part of a query is intending to rely upon data values to be read from the hole, then this may cause a possible fault condition if the read is allowed to proceed, and thus a situation may exist that may require the read request to be errored out.

This document will now describe an approach to use space usage trends to control the manner in which space is allocated or de-allocated. In some embodiments, the database knows the space usage trend in the system, and can optimistically and/or incrementally grow or shrink database objects (e.g., files) based at least in part upon the identified trends.

Figure 7:
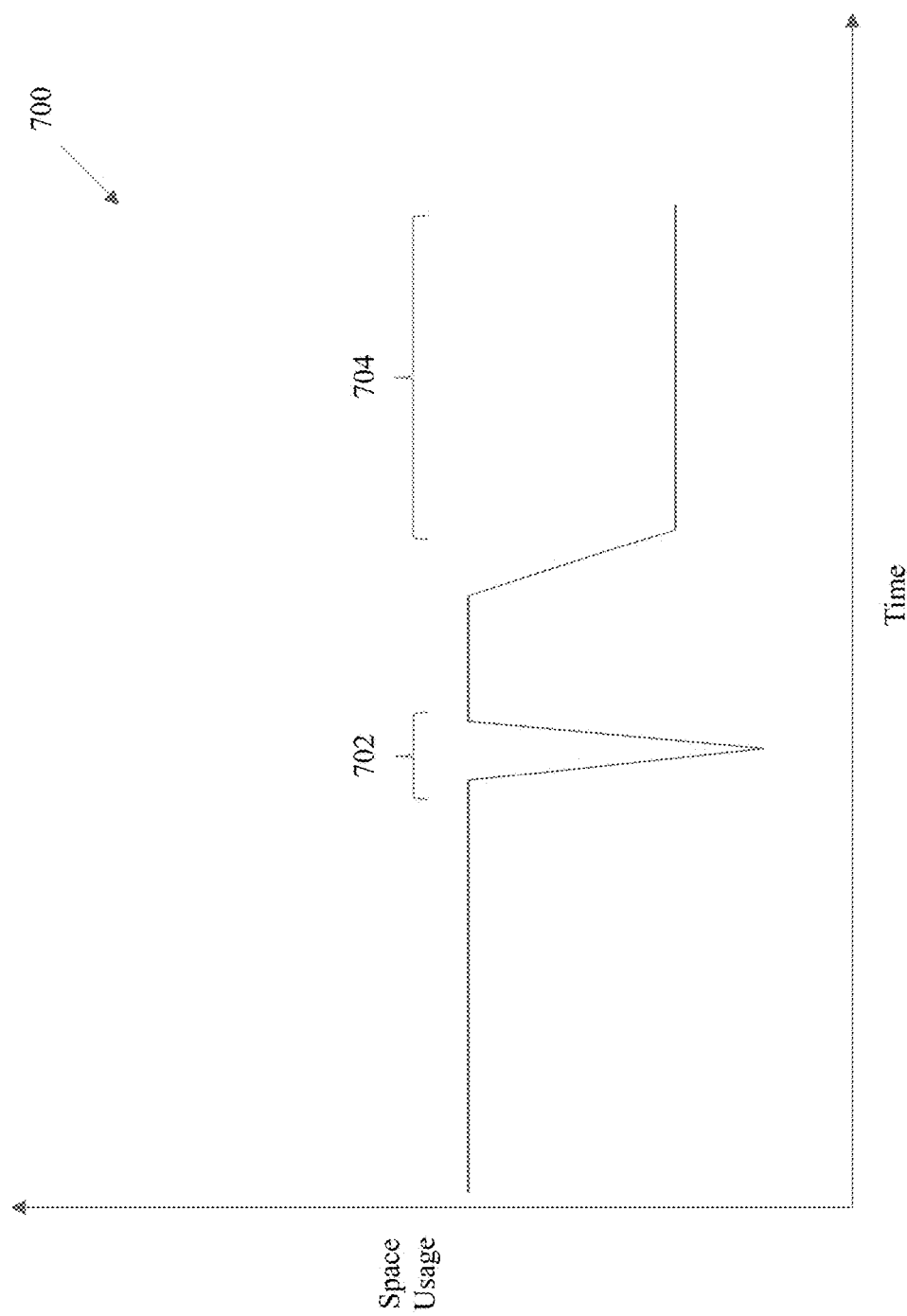
FIG. 7 shows an example space usage chart.

To illustrate, consider the example space usage chart 700 shown in FIG. 7. Here, the space usage chart shows a period of time 702 having a momentary dip in space usage, while time period 704 shows a more sustained drop in space usage requirements. It is noted that identification of these time periods showing changes in space usage, as well as the characteristics of these change time periods, can be used to control and optimize how space is allocated or de-allocated. For instance, in time period 702, since this appears to be merely an ephemeral change in space usage and not indicative of a long term trend, the database system may not make any significant changes in its allocations or de-allocations as a result of this time period. In contrast, time period 704 does appear to be indicative of a longer term trend in decreased space usage, and thus would lend itself to implement changes in space allocations/de-allocations as a result of this identification of a significant change in usage patterns.

Figure 8:
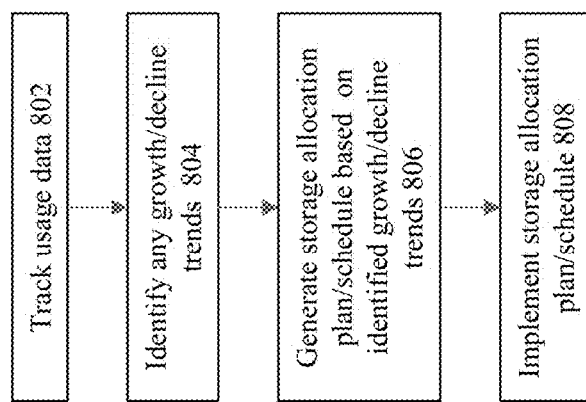
FIG. 8 shows a flowchart of an approach to use space usage trends to control and affect changes in space allocations and de-allocations according to some embodiments of the invention.

FIG. 8 shows a flowchart of an approach to use space usage trends to control and affect changes in space allocations and de-allocations according to some embodiments of the invention. At 802, usage data is tracked in the database system. In some embodiments, every N minutes, a "tablespace monitoring" background process kicks in to compute the delta in USED SPACE within a tablespace.

At 804, the usage data is analyzed to determine and identify any growth/decline trends in space usage. For example, the delta identified for USED SPACE within a tablespace can be used to identify trends, where the delta can be positive if space usage is increasing or negative otherwise. An Exponential Moving Average (EMA) can be computed for the delta in USED SPACE. This approach weights recent data points more heavily and ages out old data points.

At 806, a storage allocation plan/schedule can be generated based at least in part on the identified trends. Thereafter, at 808, the storage allocation plan/schedule is implemented, and allocations/hole punching applied as according to the plan/schedule.

For example, when there is a negative EMA, the tablespace is a candidate for shrinking via hole punching. Unlike traditional shrink which relies on trimming the tail of the datafile, hole punching allows any extent to be released regardless of its position. Since the sequence of punching and then re-materializing the hole is wasteful, it is assumed that the best candidate to free is the one which is the coldest.

Each extent maintains its last modified SCN. A heatmap component can be used to provide an interface to filter or order the list of extents based on the last modified SCN. A policy can be specified to define cold extents as NOT MODIFIED IN {integer} DAYS. This policy can either be specified manually via SQL or automatically defined by the database. The filter can be used to find all extents which satisfies the policy, and such extents will be punched. Alternatively, the database can punch the least modified extents by ordering the extents.

Even though the overhead of materializing a hole is likely to be very small, the database will try to limit the number of holes to punch. The EMA can be used as a predictor of future space usage in bytes. If the EMA is −K bytes, the approach will punch M extents where the "space occupied by M extents" *"some factor (e.g. 10%)"=K.

Therefore, what has been described is an improved approach to reclaim free space in a database system by using advanced and automated hole punching. By using this invention, the database and its users can expect better performance since database objects become less fragmented, and various types of workloads can benefit from better caching across various layers and reduced I/O costs. In addition, the database system can provide a more cost-effective database platform by overprovisioning storage, since free space is not locked up unnecessary in a tenant database. This is especially true on certain types of tablespaces e.g. temp and undo which may grow significantly if there is a burst of sorts, joins, or transactional activity. Such tablespace remain large even after the activity have subsided. Permanent tablespaces can encounter the same situation when large objects are dropped/truncated. Moreover, this approach provides an automated way to free up space without requiring manual intervention by a DBA to manually reorganize database objects to free up space.

System Architecture

Figure 9:
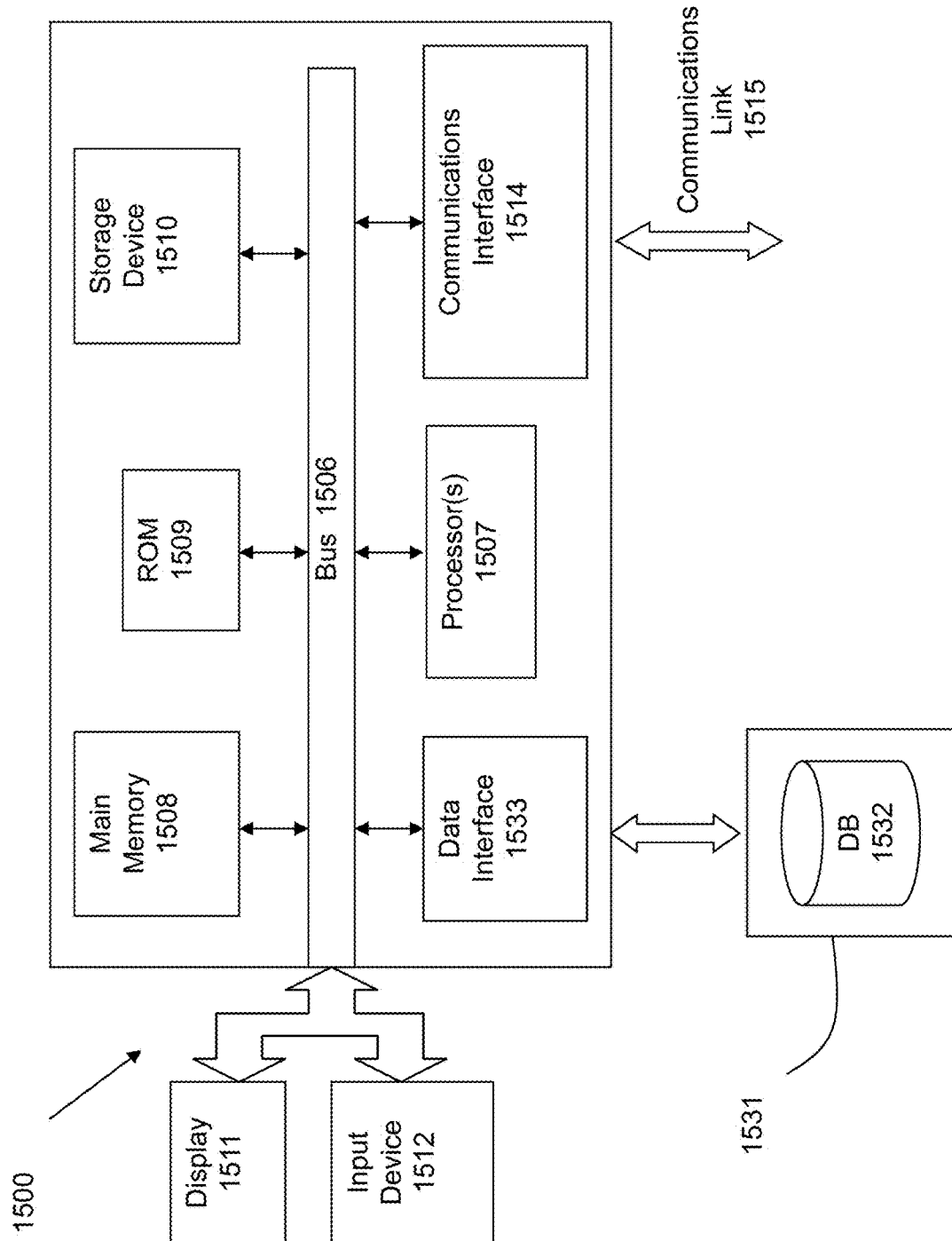
FIG. 9 is a block diagram of an illustrative computing system suitable for implementing an embodiment of the present disclosure.

FIG. 9 is a block diagram of an illustrative computing system 1500 suitable for implementing an embodiment of the present invention. Computer system 1500 includes a bus 1506 or other communication mechanism for communicating information, which interconnects subsystems and devices, such as processor 1507, system memory 1508 (e.g., RAM), static storage device 1509 (e.g., ROM), disk drive 1510 (e.g., magnetic or optical), communication interface 1514 (e.g., modem or Ethernet card), display 1511 (e.g., CRT or LCD), input device 1512 (e.g., keyboard), and cursor control.

According to some embodiments of the invention, computer system 1500 performs specific operations by processor 1507 executing one or more sequences of one or more instructions contained in system memory 1508. Such instructions may be read into system memory 1508 from another computer readable/usable medium, such as static storage device 1509 or disk drive 1510. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1507 for execution. Such a medium may take many forms, including but not limited to, non-volatile media and volatile media. Non-volatile media includes, for example, optical or magnetic disks, such as disk drive 1510. Volatile media includes dynamic memory, such as system memory 1508.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1500. According to other embodiments of the invention, two or more computer systems 1500 coupled by communication link 1510 (e.g., LAN, PTSN, or wireless network) may perform the sequence of instructions required to practice the invention in coordination with one another.

Computer system 1500 may transmit and receive messages, data, and instructions, including program, i.e., application code, through communication link 1515 and communication interface 1514. Received program code may be executed by processor 1507 as it is received, and/or stored in disk drive 1510, or other non-volatile storage for later execution. A database 1532 in a storage medium 1531 may be used to store data accessible by the system 1500.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 10:
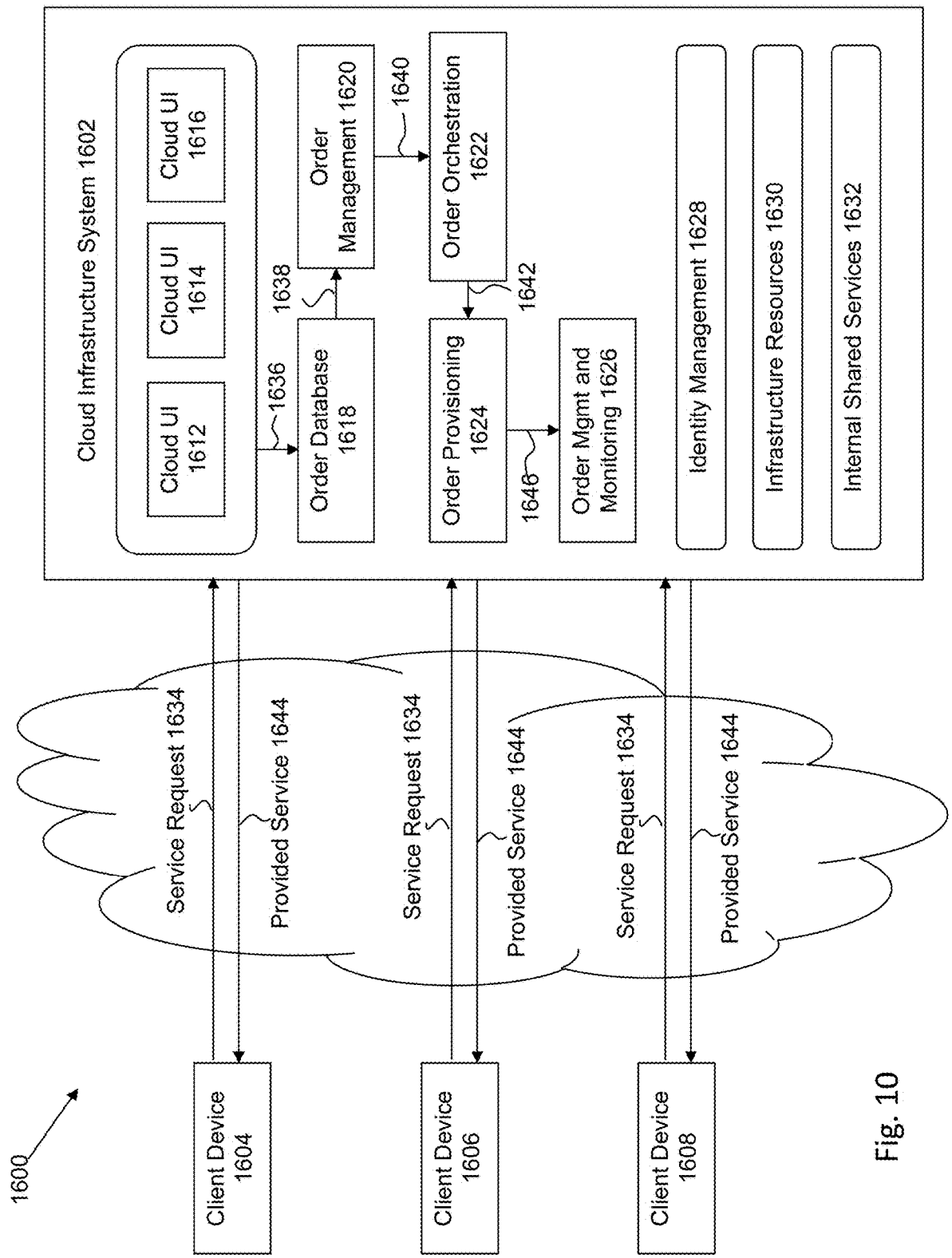
FIG. 10 is a block diagram of one or more components of a system environment by which services provided by one or more components of an embodiment system may be offered as cloud services, in accordance with an embodiment of the present disclosure.

FIG. 10 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application, or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the invention. In some other embodiments, cloud infrastructure system 1602 may have more or fewer components than shown in the figure, may combine two or more components, or may have a different configuration or arrangement of components. Client computing devices 1604, 1606, and 1608 may be devices similar to those described above for FIG. 9. Although system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that can support data communications using any of a variety of commercially-available protocols. Cloud infrastructure system 1602 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner.

In various embodiments, cloud infrastructure system 1602 may be adapted to automatically provision, manage and track a customer's subscription to services offered by cloud infrastructure system 1602. Cloud infrastructure system 1602 may provide the cloudservices via different deployment models. For example, services may be provided under a public cloud model in which cloud infrastructure system 1602 is owned by an organization selling cloud services and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1602 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616. At operation 1636, the order is stored in order database 1618. Order database 1618 can be one of several databases operated by cloud infrastructure system 1618 and operated in conjunction with other system elements. At operation 1638, the order information is forwarded to an order management module 1620. In some instances, order management module 1620 may be configured to perform billing and accounting functions related to the order, such as verifying the order, and upon verification, booking the order. At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1602 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1602 may include an identity management module 1628. Identity management module 1628 may be configured to provide identity services, such as access management and authorization services in cloud infrastructure system 1602. In some embodiments, identity management module 1628 may control information about customers who wish to utilize the services provided by cloud infrastructure system 1602. Such information can include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   identifying a free extent in a database system, wherein a physical storage is allocated to the free extent at a physical storage layer;
   determining that the free extent is a hole that is located between two allocated extents within a file;
   determining whether a database consistency problem will exist if the free extent is disassociated from the physical storage; and
   deallocating the physical storage from the free extent after making a determination whether the database consistency problem will occur if the free extent is disassociated from the physical storage.

2. The method of claim 1, further comprising receiving a write request for the free extent, wherein a physical storage allocation is made to materialize storage at the physical storage layer for the free extent in response to the write request.

3. The method of claim 2, wherein the storage that is materialized is at least one of a second physical storage within the physical storage layer, or the physical storage that was previously allocated to the free extent if currently available.

4. The method of claim 1, further comprising receiving a read request for the free extent, wherein a read response having a designated data format indicative of deallocation of the physical storage is provided in response to the read request.

5. The method of claim 1, wherein the physical storage layer maintains metadata that tracks associations between a physical storage allocation and a logical allocation of a database object that is associated with the physical storage allocation.

6. The method of claim 5, wherein deallocation of the physical storage from the free extent comprises an action to break a link between the physical storage allocation and the logical allocation in the metadata.

7. The method of claim 1, wherein determining whether the database consistently problem will exist if the free extent is disassociated from the physical storage is performed by evaluation of a system commit number (SCN) to determine whether a database change located within the physical storage to be deallocated will create the database consistently problem if deleted.

8. The method of claim 1, wherein a space usage trend is identified, and a schedule is configured to control allocation or deallocation of the physical storage.

9. The method of claim 1, wherein the database system does not maintain state that identifies the free extent as a hole.

10. A system, comprising:
    a processor;
    a memory for holding programmable code; and
    wherein the programmable code includes instructions executable by the processor for identifying a free extent in a database system, wherein a physical storage is allocated to the free extent at a physical storage layer; determining that the free extent is a hole that is located between two allocated extents within a file; determining whether a database consistently problem will exist if the free extent is disassociated from the physical storage; and deallocating the physical storage from the free extent after making a determination whether the database consistency problem will occur if the free extent is disassociated from the physical storage.

11. The system of claim 10, wherein the programmable code further comprises the instructions for a write request for the free extent, wherein a physical storage allocation is made to materialize storage at the physical storage layer for the free extent in response to the write request.

12. The system of claim 11, wherein the storage that is materialized is at least one of a second physical storage within the physical storage layer, or the physical storage that was previously allocated to the free extent if currently available.

13. The system of claim 10, wherein the programmable code further comprises the instructions for receiving a read request for the free extent, wherein a read response having a designated data format indicative of deallocation of the physical storage is provided in response to the read request.

14. The system of claim 10, wherein the physical storage layer maintains metadata that tracks associations between a physical storage allocation and a logical allocation of a database object that is associated with the physical storage allocation.

15. The system of claim 14, wherein deallocation of the physical storage from the free extent comprises an action to break a link between the physical storage allocation and the logical allocation in the metadata.

16. The system of claim 10, wherein determining whether the database consistently problem will exist if the free extent is disassociated from the physical storage is performed by evaluation of a system commit number (SCN) to determine whether a database change located within the physical storage to be deallocated will create the database consistently problem if deleted.

17. The system of claim 10, wherein a space usage trend is identified, and a schedule is configured to control allocation or deallocation of the physical storage.

18. The system of claim 10, wherein the database system does not maintain state that identifies the free extent as a hole.

19. A computer program product embodied on a computer readable medium, the computer readable medium having stored thereon a sequence of instructions which, when executed by a processor, executes a method comprising:
identifying a free extent in a database system, wherein a physical storage is allocated to the free extent at a physical storage layer;
determining that the free extent is a hole that is located between two allocated extents within a file;
determining whether a database consistently problem will exist if the free extent is disassociated from the physical storage; and
deallocating the physical storage from the free extent after making a determination whether the database consistency problem will occur if the free extent is disassociated from the physical storage.

20. The computer program product of claim 19, wherein the sequence of instructions performs receiving a write request for the free extent, wherein a physical storage allocation is made to materialize storage at the physical storage layer for the free extent in response to the write request.

21. The computer program product of claim 20, wherein the storage that is materialized is at least one of a second physical storage within the physical storage layer, or the physical storage that was previously allocated to the free extent if currently available.

22. The computer program product of claim 19, wherein the sequence of instructions performs receiving a read request for the free extent, wherein a read response having a designated data format indicative of deallocation of the physical storage is provided in response to the read request.

23. The computer program product of claim 19, wherein the physical storage layer maintains metadata that tracks associations between a physical storage allocation and a logical allocation of a database object that is associated with the physical storage allocation.

24. The computer program product of claim 23, wherein deallocation of the physical storage from the free extent comprises an action to break a link between the physical storage allocation and the logical allocation in the metadata.

25. The computer program product of claim 19, wherein determining whether the database consistently problem will exist if the free extent is disassociated from the physical storage is performed by evaluation of a system commit number (SCN) to determine whether a database change located within the physical storage to be deallocated will create the database consistently problem if deleted.

26. The computer program product of claim 19, wherein a space usage trend is identified, and a schedule is configured to control allocation or deallocation of the physical storage.

27. The computer program product of claim 19, wherein the database system does not maintain state that identifies the free extent as a hole.

* * * * *